United States Patent
Liao et al.

(10) Patent No.: US 9,782,956 B2
(45) Date of Patent: Oct. 10, 2017

(54) POLYMER COATING ON SUBSTRATES USING THERMAL SPRAY TECHNIQUES

(71) Applicants: Hanlin Liao, Belfort (FR); Camelia Demian, Belfort (FR); Lianxiang Wang, Shanghai (CN); Xiaoye Liu, Shanghai (CN)

(72) Inventors: Hanlin Liao, Belfort (FR); Camelia Demian, Belfort (FR); Lianxiang Wang, Shanghai (CN); Xiaoye Liu, Shanghai (CN)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 13/728,405

(22) Filed: Dec. 27, 2012

(65) Prior Publication Data

US 2013/0183488 A1  Jul. 18, 2013

Related U.S. Application Data

(60) Provisional application No. 61/681,421, filed on Aug. 9, 2012.

(30) Foreign Application Priority Data

Dec. 28, 2011  (FR) ..................... 11 04125

(51) Int. Cl.
*B32B 27/08* (2006.01)
*B32B 15/08* (2006.01)
(Continued)

(52) U.S. Cl.
CPC ............. *B32B 27/08* (2013.01); *B32B 3/26* (2013.01); *B32B 7/04* (2013.01); *B32B 15/08* (2013.01);
(Continued)

(58) Field of Classification Search
CPC ......... B32B 27/08; B32B 3/26; B32B 27/304; B32B 27/322; B32B 27/288; F16C 33/20;
(Continued)

(56) References Cited

U.S. PATENT DOCUMENTS 3,692,558 A  9/1972 Werner
3,697,309 A  10/1972 Werner
(Continued)

FOREIGN PATENT DOCUMENTS

CA  1322747 C  10/1993
CA  2152279 A1  7/1994
(Continued)

OTHER PUBLICATIONS

International Search Report from PCT Application No. PCT/US2012/071775 dated Apr. 24, 2013, 1 pg.
(Continued)

*Primary Examiner* — Aaron Austin
*Assistant Examiner* — Jasper Saberi
(74) *Attorney, Agent, or Firm* — Chi S. Kim; Abel Law Group, LLP

(57) ABSTRACT

A laminate article can include a substrate and a layer of a heterogeneous mixture of a non-fluorinated polymer compound and a fluorinated polymer compound. The laminate article can include a gradual concentration gradient along an axis perpendicular to the substrate. The gradual concentration gradient can include the change of the amount of the non-fluorinated polymer and the fluorinated polymer compound relative to the axis perpendicular to the substrate. The layer can further include at least one filler. The laminate can be applied as a bearing material.

19 Claims, 3 Drawing Sheets

(51) Int. Cl.
  *B32B 15/20*   (2006.01)
  *B32B 27/28*   (2006.01)
  *B32B 27/30*   (2006.01)
  *B32B 27/32*   (2006.01)
  *B32B 3/26*    (2006.01)
  *B32B 7/04*    (2006.01)
  *B32B 27/20*   (2006.01)
  *B32B 27/22*   (2006.01)
  *C09D 127/18*  (2006.01)
  *C09D 171/00*  (2006.01)
  *F16C 33/20*   (2006.01)

(52) U.S. Cl.
  CPC .............. *B32B 15/20* (2013.01); *B32B 27/20* (2013.01); *B32B 27/22* (2013.01); *B32B 27/288* (2013.01); *B32B 27/304* (2013.01); *B32B 27/322* (2013.01); *C09D 127/18* (2013.01); *C09D 171/00* (2013.01); *F16C 33/206* (2013.01); *F16C 33/208* (2013.01); *F16C 33/201* (2013.01); *F16C 33/203* (2013.01); *F16C 33/205* (2013.01); *F16C 2208/02* (2013.01); *F16C 2208/30* (2013.01); *F16C 2240/60* (2013.01); *Y10T 428/24355* (2015.01); *Y10T 428/249958* (2015.04); *Y10T 428/263* (2015.01); *Y10T 428/265* (2015.01); *Y10T 428/3154* (2015.04)

(58) Field of Classification Search
  CPC .... F16C 33/201; F16C 33/203; F16C 33/205; F16C 33/208; F16C 2208/30; F16C 2208/32; F16C 2208/34
  USPC .............. 428/141, 422, 421, 908.8; 384/42; 508/104
  See application file for complete search history.

(56) References Cited

U.S. PATENT DOCUMENTS

| | | | |
|---|---|---|---|
| 3,911,161 A | 10/1975 | Nord et al. | |
| 4,011,361 A | 3/1977 | Vassiliou et al. | |
| 4,016,125 A | 4/1977 | Vassiliou et al. | |
| 4,039,713 A | 8/1977 | Vassiliou et al. | |
| 4,049,863 A | 9/1977 | Vassiliou et al. | |
| 4,070,525 A | 1/1978 | Vassiliou et al. | |
| 4,319,942 A | 3/1982 | Brenner | |
| 4,413,019 A | 11/1983 | Brenner | |
| 4,483,951 A | 11/1984 | Brenner | |
| 4,548,989 A | 10/1985 | Allen et al. | |
| 4,592,782 A | 6/1986 | Davies | |
| 4,595,718 A | 6/1986 | Allen et al. | |
| 4,624,887 A | 11/1986 | Bickle et al. | |
| 4,655,944 A | 4/1987 | Mori | |
| 4,812,367 A | 3/1989 | Bickle | |
| 4,868,234 A | 9/1989 | Tabb et al. | |
| 4,925,892 A | 5/1990 | Tabb et al. | |
| 5,039,575 A | 8/1991 | Mori et al. | |
| 5,230,961 A * | 7/1993 | Tannenbaum | 428/422 |
| 5,239,026 A | 8/1993 | Babirad et al. | |
| 5,364,682 A | 11/1994 | Tanaka et al. | |
| 5,573,846 A | 11/1996 | Harig et al. | |
| 5,686,176 A * | 11/1997 | Adam et al. | 428/327 |
| 5,863,657 A | 1/1999 | Kawashima et al. | |
| 5,882,466 A | 3/1999 | Grootaert et al. | |
| 6,001,205 A | 12/1999 | Mauro | |
| 6,085,797 A | 7/2000 | Grabaum et al. | |
| 6,140,410 A | 10/2000 | Kolouch | |
| 6,183,137 B1 | 2/2001 | Kojima et al. | |
| 6,183,869 B1 | 2/2001 | Okuda et al. | |
| 6,258,413 B1 | 7/2001 | Woelki et al. | |
| 6,312,814 B1 | 11/2001 | Kolouch | |
| 6,316,534 B1 | 11/2001 | Shimokusuzono et al. | |
| 6,372,284 B1 | 4/2002 | Hess et al. | |
| 6,376,061 B1 | 4/2002 | Adam | |
| 6,413,588 B1 | 7/2002 | Pettus et al. | |
| 6,425,977 B2 | 7/2002 | McDonald et al. | |
| 6,528,143 B1 | 3/2003 | Adam | |
| 6,531,950 B1 | 3/2003 | Becker et al. | |
| 6,565,257 B1 | 5/2003 | Kennedy et al. | |
| 6,569,816 B2 | 5/2003 | Oohira et al. | |
| 6,726,994 B1 | 4/2004 | Araki et al. | |
| 6,759,129 B2 | 7/2004 | Fukushi | |
| 6,770,378 B1 | 8/2004 | Lehmann | |
| 7,022,402 B2 | 4/2006 | Lacourt | |
| 7,025,853 B2 | 4/2006 | Kesselmayer | |
| 7,241,817 B2 | 7/2007 | Bonnet et al. | |
| 7,491,446 B2 | 2/2009 | Ueda et al. | |
| 7,581,734 B1 | 9/2009 | McLeod | |
| 7,829,618 B2 | 11/2010 | Longo et al. | |
| 7,887,922 B2 | 2/2011 | Mayston et al. | |
| 7,910,527 B2 | 3/2011 | Sawyer et al. | |
| 7,942,581 B2 * | 5/2011 | Leonardelli | 384/276 |
| 8,349,773 B2 | 1/2013 | Takayanagi et al. | |
| 8,646,977 B2 | 2/2014 | Adam | |
| 8,802,602 B2 | 8/2014 | Schmitjes et al. | |
| 2002/0117280 A1 | 8/2002 | Howle et al. | |
| 2003/0024380 A1 | 2/2003 | Shimo et al. | |
| 2003/0044553 A1 | 3/2003 | Ramanathan et al. | |
| 2003/0049485 A1 | 3/2003 | Brupbacher et al. | |
| 2003/0079847 A1 | 5/2003 | Howle et al. | |
| 2003/0104223 A1 | 6/2003 | Ferm et al. | |
| 2003/0158338 A1 | 8/2003 | Jazenski et al. | |
| 2003/0207118 A1 | 11/2003 | Fukushi | |
| 2004/0006867 A1 | 1/2004 | Becker et al. | |
| 2004/0071987 A1 | 4/2004 | Bate | |
| 2004/0096610 A1 | 5/2004 | Ramanathan et al. | |
| 2004/0115465 A1 | 6/2004 | Bickle et al. | |
| 2004/0115477 A1 | 6/2004 | Nesbitt | |
| 2004/0116792 A1 | 6/2004 | Nesbitt | |
| 2004/0167263 A1 | 8/2004 | Bate | |
| 2004/0228555 A1 | 11/2004 | Kim et al. | |
| 2005/0025977 A1 | 2/2005 | Adam et al. | |
| 2005/0048218 A1 | 3/2005 | Weidman | |
| 2005/0069778 A1 | 3/2005 | Bonnet et al. | |
| 2005/0090602 A1 | 4/2005 | Koshikawa | |
| 2005/0228441 A1 * | 10/2005 | Wood et al. | 606/205 |
| 2005/0233152 A1 | 10/2005 | Bate | |
| 2005/0266170 A1 | 12/2005 | Nesbitt | |
| 2006/0029795 A1 * | 2/2006 | Sawyer | B32B 5/14 428/339 |
| 2006/0110601 A1 | 5/2006 | Hennessey | |
| 2006/0229424 A1 | 10/2006 | Griswold et al. | |
| 2006/0247360 A1 | 11/2006 | Halasa et al. | |
| 2006/0247369 A1 | 11/2006 | Griswold et al. | |
| 2006/0247370 A1 | 11/2006 | Frye et al. | |
| 2007/0021544 A1 | 1/2007 | Yanase et al. | |
| 2007/0031275 A1 | 2/2007 | Nogawa et al. | |
| 2007/0092173 A1 | 4/2007 | Tsuji et al. | |
| 2007/0106294 A1 | 5/2007 | Nesbitt | |
| 2007/0110937 A1 | 5/2007 | Lokere et al. | |
| 2007/0123853 A1 | 5/2007 | Nesbitt | |
| 2007/0173590 A1 | 7/2007 | Longo et al. | |
| 2007/0177833 A1 | 8/2007 | Egami et al. | |
| 2007/0225177 A1 * | 9/2007 | Murase | C10M 103/00 508/104 |
| 2007/0232502 A1 * | 10/2007 | Tsutsui | C08J 9/40 508/104 |
| 2007/0269151 A1 * | 11/2007 | Nardi | C23C 4/02 384/279 |
| 2007/0281872 A1 | 12/2007 | Schubert et al. | |
| 2007/0298217 A1 | 12/2007 | Chen et al. | |
| 2008/0032060 A1 | 2/2008 | Nesbitt | |
| 2008/0050509 A1 | 2/2008 | Nesbitt | |
| 2008/0057251 A1 | 3/2008 | Griswold et al. | |
| 2008/0102307 A1 | 5/2008 | Zidar | |
| 2008/0113206 A1 | 5/2008 | Hoy et al. | |
| 2008/0159671 A1 | 7/2008 | Leonardelli | |
| 2008/0226933 A1 | 9/2008 | Bickle et al. | |
| 2009/0092827 A1 | 4/2009 | Robinson | |
| 2009/0304957 A1 | 12/2009 | Jamil et al. | |
| 2010/0028684 A1 | 2/2010 | Mariscal et al. | |
| 2010/0047467 A1 | 2/2010 | Nesbitt | |

(56) References Cited

U.S. PATENT DOCUMENTS

| | | | |
|---|---|---|---|
| 2010/0092119 A1 | 4/2010 | Angenheister | |
| 2010/0098360 A1 | 4/2010 | Schmitjes et al. | |
| 2010/0119188 A1 | 5/2010 | Hsueh et al. | |
| 2010/0197849 A1 | 8/2010 | Momose et al. | |
| 2010/0215834 A1 | 8/2010 | Nesbitt | |
| 2010/0239883 A1 | 9/2010 | Okladek et al. | |
| 2010/0290726 A1 | 11/2010 | Schlipf et al. | |
| 2010/0301525 A1 | 12/2010 | Price et al. | |
| 2010/0304063 A1 | 12/2010 | McCrea et al. | |
| 2011/0023726 A1 | 2/2011 | Nesbitt | |
| 2011/0049834 A1 | 3/2011 | Hatu | |
| 2011/0159229 A1 | 6/2011 | Doehle et al. | |
| 2011/0262064 A1 | 10/2011 | Burgeff et al. | |
| 2011/0268944 A1 | 11/2011 | Adam et al. | |
| 2011/0305874 A1 | 12/2011 | Thoumazet et al. | |
| 2012/0008887 A1* | 1/2012 | Adam | 384/42 |
| 2012/0275731 A1 | 11/2012 | Ziegler et al. | |
| 2013/0183488 A1 | 7/2013 | Liao et al. | |
| 2013/0183539 A1 | 7/2013 | Guo et al. | |
| 2013/0195388 A1 | 8/2013 | Ishii et al. | |
| 2014/0010484 A1 | 1/2014 | Schmitjes | |
| 2014/0024563 A1 | 1/2014 | Heidecker et al. | |
| 2014/0329728 A1 | 11/2014 | Peng et al. | |

FOREIGN PATENT DOCUMENTS

| | | | |
|---|---|---|---|
| CA | 2684543 A1 | 10/2008 | |
| CN | 1037481 C | 2/1998 | |
| CN | 1261386 A | 7/2000 | |
| CN | 1401898 A | 3/2003 | |
| CN | 1705830 A | 12/2005 | |
| CN | 1756911 A | 4/2006 | |
| CN | 1823132 A | 8/2006 | |
| CN | 101061191 A | 10/2007 | |
| CN | 101715392 A | 10/2010 | |
| CN | 101126417 B | 12/2010 | |
| CN | 101413543 B | 6/2011 | |
| CN | 102271906 A | 12/2011 | |
| DE | 3021369 | 12/1981 | |
| DE | 3343697 A1 | 6/1984 | |
| DE | 3401804 A1 | 7/1985 | |
| DE | 39 12 716 A1 | 10/1990 | |
| DE | 19823609 A1 | 12/1999 | |
| DE | 102005046571 A1 | 4/2007 | |
| DE | 10 2008 055 194 A1 | 7/2010 | |
| EP | 0119815 A2 | 9/1984 | |
| EP | 0232922 B1 | 6/1986 | |
| EP | 0008542 B2 | 11/1988 | |
| EP | 0223268 B1 | 3/1989 | |
| EP | 0394518 A1 | 10/1990 | |
| EP | 0650987 A1 | 5/1995 | |
| EP | 0848031 A1 | 6/1998 | |
| EP | 0988898 A2 | 3/2000 | |
| EP | 1077230 A1 | 2/2001 | |
| EP | 1724104 A4 | 7/2007 | |
| EP | 1 892 429 A2 | 2/2008 | |
| EP | 2139675 A1 | 1/2010 | |
| EP | 2702285 A2 | 3/2014 | |
| FR | 1354161 A | 3/1964 | |
| GB | 1265140 A | 3/1972 | |
| GB | 1338234 A | 11/1973 | |
| GB | 1472079 A | 4/1977 | |
| GB | 2123430 A | 2/1984 | |
| JP | 61-211525 A | 9/1986 | |
| JP | 10-331855 A | 12/1998 | |
| JP | 2000117888 A | 4/2000 | |
| JP | 2000153575 A | 6/2000 | |
| JP | 2000192961 A | 7/2000 | |
| JP | 2001511502 A | 8/2001 | |
| JP | 2002194380 A | 7/2002 | |
| JP | 2004019758 A | 1/2004 | |
| JP | 2004035890 A | 2/2004 | |
| JP | 2004505335 A | 2/2004 | |
| JP | 2004358904 A | 12/2004 | |
| JP | 2005015793 A | 1/2005 | |
| JP | 2005035300 A | 2/2005 | |
| JP | 2006111885 A | 4/2006 | |
| JP | 2007018035 A | 1/2007 | |
| JP | 2007145894 A | 6/2007 | |
| JP | 2007173446 A | 7/2007 | |
| JP | 2008264305 A | 11/2008 | |
| JP | 2009117095 A | 5/2009 | |
| JP | 2010525245 A | 7/2010 | |
| KR | 20050106066 A | 11/2005 | |
| KR | 20100012028 A | 2/2010 | |
| KR | 20101237477 A | 2/2013 | |
| MX | 2009011322 A | 12/2009 | |
| RU | 2009139818 A | 5/2011 | |
| RU | 243887 C2 | 1/2012 | |
| WO | 9415999 A1 | 7/1994 | |
| WO | 9727003 A1 | 7/1997 | |
| WO | 9844545 A1 | 10/1998 | |
| WO | 9901675 A1 | 1/1999 | |
| WO | 0029210 B | 5/2000 | |
| WO | 02096644 A | 12/2002 | |
| WO | 03/027522 A2 | 4/2003 | |
| WO | 2004056751 A1 | 7/2004 | |
| WO | 2004056754 A1 | 7/2004 | |
| WO | 2008/094652 A2 | 8/2008 | |
| WO | 2008096097 A1 | 8/2008 | |
| WO | 2008-121682 A2 | 10/2008 | |
| WO | 2008128579 A1 | 10/2008 | |
| WO | 2009144495 A2 | 12/2009 | |
| WO | 2010038137 A1 | 4/2010 | |
| WO | 2010076307 A1 | 7/2010 | |
| WO | WO 2010076307 A1 * | 7/2010 | |
| WO | 2010138172 A1 | 12/2010 | |
| WO | 2012149447 A2 | 11/2012 | |
| WO | 2013/101905 A1 | 7/2013 | |
| WO | 2013101928 A1 | 7/2013 | |
| WO | 2014001524 A1 | 1/2014 | |

OTHER PUBLICATIONS

International Search Report from PCT Application No. PCT/US2012/071814 dated Apr. 12, 2013, 1 pg.

French Search Report from FR Application No. 1104125 dated Sep. 24, 2012, 3 pgs.

Briscoe, B. J., et al., "The friction and wear of Poly(tetrafluoroethylene)-Poly(etheretherketone) composites: an initial appraisal of the optimum composition," Wear, Elsevier Sequoia, Lausanne, CH, vol. 108, Jan. 1, 1986, pp. 357-374, XP002351273.

Zhang, Z. et al., "Wear of PEEK composites related to their mechanical performances," Tribology International Butterworth Scientific LDT, Guildford, GB, vol. 37, Jan. 1, 2004, pp. 271-277, XP002351274.

U.S. Appl. No. 13/728,262, filed Dec. 27, 2012, Inventors: Qiang Guo et al., 18 pgs.

Supplementary European Search Report issued Dec. 1, 2015 in European Application No. 12862673 (2 pages).

International Search Report for PCT/EP2013/063672 dated Sep. 25, 2013, 2 pages.

U.S. Appl. No. 12/582,335 filed Oct. 20, 2009, Inventors: Olaf Schmitjes et al., 16 pages.

International Search Report for PCT/EP2007/060736 dated Jan. 18, 2008, 2 pages.

International Search Report for PCT/US2012/035621 dated Nov. 29, 2012, 2 pages.

International Search Report for PCT/EP2013/070239 dated Dec. 19, 2013, 2 pages.

U.S. Appl. No. 13/458,882, filed Apr. 27, 2012, Inventors: Julia Ziegler et al., 27 pages.

French Search Report from FR Application No. 1457516 dated Jan. 13, 2015, 6 pgs.

* cited by examiner

POLYMER COATING ON SUBSTRATES USING THERMAL SPRAY TECHNIQUES

CROSS-REFERENCE TO RELATED APPLICATIONS

The following disclosure is a non-provisional application which claims priority to French Application No. 11/04125, filed Dec. 28, 2011, entitled "POLYMER COATING ON SUBSTRATES USING THERMAL SPRAY TECHNIQUES" and having named inventors Hanlin Liao, Camelia Demian, Lianxiang Wang and Xiaoye Liu, and further claims priority to U.S. Provisional Application No. 61/681,421, filed Aug. 9, 2012, entitled "POLYMER COATING ON SUBSTRATES USING THERMAL SPRAY TECHNIQUES" and having named inventors Hanlin Liao, Camelia Demian, Lianxiang Wang and Xiaoye Liu, the applications of which are incorporated by reference herein in their entirety.

FIELD OF THE DISCLOSURE

The disclosure relates to laminates comprising a substrate, a transition layer comprising a non-fluorinated thermoplastic applied directly thereto and a fluorinated polymer, which can serve as a sliding layer applied to the transition layer.

BACKGROUND

Laminates which comprise a layer structure having a metallic support material, an intermediate layer and a sliding layer applied thereto have been known for a long time in a variety of forms from the prior art and are used in a wide variety of technical fields, for example in the field of automotive engineering.

For slide bearings, especially conventional DU® bearing material, a sliding layer composed of a PTFE compound material is in turn applied to the intermediate layer. In this slide bearing material, the intermediate layer, which has the function of establishing firm adhesion of the sliding layer to the support material, is just a bronze layer sintered from bronze particles. However, this process is problematic for a variety of reasons, including performance limitations of the laminate product and failure in ensuring the combination between PTFE and the support material. As such, there is a continued need for improved laminates for applications such as slide bearings.

Therefore, it would be advantageous if a laminate could be produced that has strong adhesion to the metal support and the sliding layer.

SUMMARY

In a first aspect, a laminate article includes a substrate and a layer. The layer can include a heterogeneous mixture of a non-fluorinated polymer compound and a fluorinated polymer compound. The laminate article can include a gradual concentration gradient along an axis perpendicular to the substrate. The gradual concentration gradient can include the change of the amount of the non-fluorinated polymer and the fluorinated polymer compound relative to the axis perpendicular to the substrate.

In a second aspect, a laminate article can include a substrate and a porous non-fluorinated polymer layer overlying the substrate. The laminate can further include a fluorinated polymer compound layer. The fluorinated polymer compound layer can overlie and penetrate the porous non-fluorinated layer.

In a third aspect, bearing article can include a metal substrate and a discontinuous layer of a non-fluorinated polymer overlying the metal substrate. The bearing article can further include a layer of a fluorinated polymer compound. The fluorinated polymer compound can overlie and penetrate the discontinuous layer.

In a fourth aspect, a bearing material can include a metal substrate having a roughened surface. The bearing material can further include a porous PEEK layer. The bearing material can further include a continuous PTFE composition layer. The continuous PTFE composition layer can overlie and penetrate the porous PEEK layer.

In a fifth aspect, a method of manufacturing a bearing article can include providing a substrate having a major surface and roughening the major surface of the substrate. The method can further include applying a layer of a non-fluorinated polymer onto the major surface. The method can further include coating the non-fluorinated polymer layer with a fluoropolymer composition to form a laminate. The method can further include pressing the laminate to form the bearing article.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In one embodiment, a laminate article includes a substrate. The laminate can further include a layer comprising a heterogeneous mixture. The heterogeneous mixture can further include a non-fluorinated polymer compound. Moreover, the heterogeneous mixture can include a fluorinated polymer compound. The laminate article can include a gradual concentration gradient along an axis perpendicular to the substrate. The gradual concentration gradient includes a change of an amount of the non-fluorinated polymer and the fluorinated polymer compound relative to the axis perpendicular to the substrate.

Figure 1:
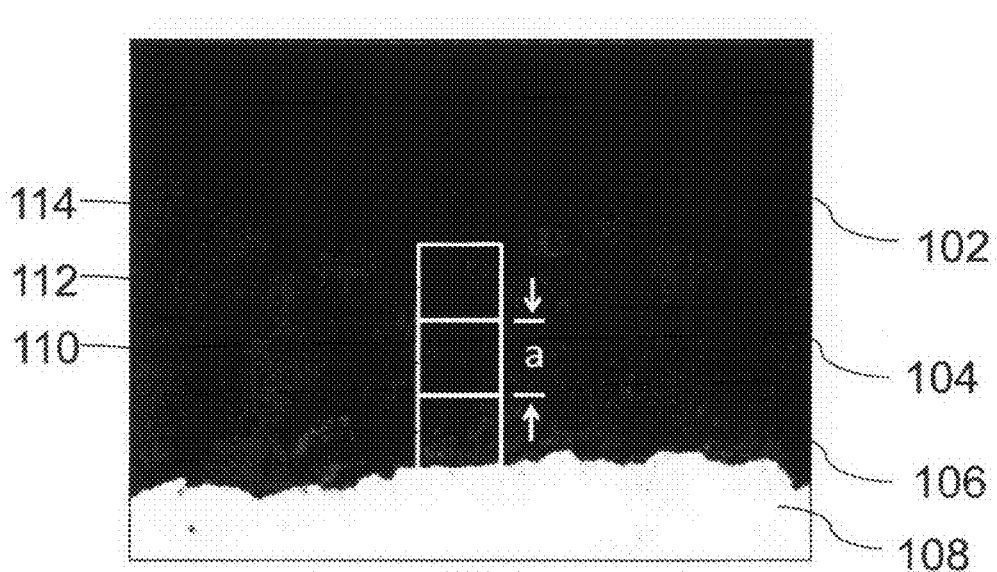
FIG. 1 shows an exemplary laminate in sectional view.

FIG. 1 shows an exemplary laminate in sectional view. Layer 102 depicts a fluorinated polymer compound, such as PTFE, overlying non-fluorinated polymer layer material 106, which in this example is PEEK. The fluorinated polymer compound of layer 102 and the fluorinated compound can penetrate layer 106, thereby forming mixed regions 104. Layer 106 overlies substrate 108.

Addressing the substrate 108 of the laminate, in embodiments, the substrate can include a metal substrate or metal alloy substrate. The metal substrate can include a metal or a metal alloy. In one particular embodiment, the metal substrate can include aluminium. In another particular embodiment, the metal alloy substrate can include steel, bronze, or brass. In embodiments, the metal support includes steel, cold-rolled steel material No. 1.0338, cold-rolled steel material No. 1.0347, matt zinc-plated steel, stainless steel material No. 1.4512, stainless steel material No. 1.4720, stainless steel material No. 1.4310, aluminum, alloys, or any combinations thereof.

Further addressing the substrate 108, the substrate can have a surface roughness of at least about 0.5 microns, such as at least about 1 micron, at least about 5 microns, at least about 10 microns, or at least about 100 microns. In another embodiment, the substrate can have a surface roughness of not greater than about 500 microns, such as not greater than about 200 microns, not greater than about 100 microns, not greater than about 80 microns, or even not greater than about 40 microns. Moreover, it will be appreciated that the total surface roughness of substrate 108 can be within a range between any of the minimum and maximum values noted above.

In yet another embodiment, the substrate 108 can be pretreated to have a desired surface roughness. In one instance, substrate 108 can include a surface feature. For example, for metal or metal alloy substrates, the major surface can include a structured plate, a ribbed sheet, a woven fabric, a mesh, or metal foam. In a particular embodiment, the metal or metal alloy substrate has a honeycomb surface feature. In yet other embodiments, the surface of a metal substrate can be treated by electrolytic zinc-plating to roughen, upgrade, or coat the surface. In other embodiments, the major surface of the metal support can be increased by mechanical structuring. The structuring can include brush-finishing, sand-blasting, etching, perforating, pickling, punching, pressing, curling, deep drawing, decambering, incremental sheet forming, ironing, laser cutting, rolling, hammering, embossing, undercutting, and any combinations thereof.

Addressing layer 106 formed by the non-fluorinated polymer compound, in embodiments, the non-fluorinated polymer compound forms a porous or discontinuous non-fluorinated polymer layer overlying the substrate 108. The non-fluorinated polymer layer can have a porosity, defined as the ratio of void volume over total volume of non-fluorinated polymer and determined after applying the non-fluorinated polymer as layer 106 to the substrate 108 and before any further processing.

The porosity may be in the form of open porosity defining an interconnected network of channels extending throughout the layer 106. Alternatively, the layer 106 may include a content of closed porosity described and characterized by discrete and individual pores separated from each other. In at least one embodiment, layer 106 can include a mix of open porosity and closed porosity.

The amount of porosity within the layer can comprise a majority content, such as greater than 50 vol % for the total volume of layer 106. In still other instances, layer 106 may include a minority content of porosity, which can represent less than 50 vol % of the total volume of the layer. Furthermore, the body may contain a majority content of closed porosity. Still, in other instances, the bonded abrasive body may contain a majority content of open porosity.

In certain instances, the porosity may be not greater than about 70 vol % for the total volume of layer 106. In yet other instances, layer 106 may be formed such that the amount of porosity is not greater than about 60 vol %, such as not greater than about 50 vol %, not greater than about 40 vol %, not greater than about 30 vol %, not greater than about 25 vol %, not greater than about 20 vol %, not greater than about 15 vol %, not greater than about 10 vol %, not greater than about 5 vol %, or even not greater than about 2 vol % In at least one non-limiting embodiment, layer 106 may contain an amount of porosity of at least about 1 vol %, such as at least about 5 vol %, at least at about 10 vol %, at least about 20 vol %, at least about 30 vol %, or even at least about 40 vol % Moreover, it will be appreciated that the total amount of porosity within layer 106 can be within a range between any of the minimum and maximum percentages noted above.

Still referring to layer 106, in other embodiments, the non-fluorinated polymer compound forms a discontinuous layer. A discontinuous layer provides the basis for a concentration gradient. A concentration gradient in a cross-section of a laminate is the difference of the amount of one ingredient between two adjacent unit cells. A gradual concentration gradient is established when the amount of ingredient decreases or increases subsequently in three adjacent unit cells, wherein the three unit cells are aligned along an axis.

As shown in FIG. 1, unit cells 110, 112, and 114 are aligned along an axis that is perpendicular to substrate 108. The unit cells have the edge length a. The edge length a can vary and can be a fraction of the average thickness of layer 106. For example, edge length a can be a third, a fourth, a fifth, or even a sixth of the average thickness of layer 106. In other embodiments, edge length can be at least about 2 microns, such as at least about 4 microns, or even about 8 microns. In other embodiments, edge length a can be not greater than about 20 microns, such as not greater than about 15 microns, or even not greater than about 10 microns. In other embodiments, edge length a is selected in such a way that three adjacent unit cells along an axis perpendicular to substrate 108 cover at least about 0.7, such as at least about 0.8, or even at least about 0.9 of the average thickness of layer 106. In other embodiments, edge length a is selected is such a way that three adjacent unit cells along an axis perpendicular to substrate 108 cover not greater than about 0.99, such as not greater than about 0.98, or even not greater than about 0.95 of the average thickness of layer 106.

For a gradual concentration gradient, unit cells 110, 112, and 114 contain different amounts of the non-fluorinated polymer compound, wherein the amount is decreasing along the axis perpendicular to substrate 108. In one embodiment, for a gradual concentration gradient, the amount of non-fluorinated polymer in unit cell 114 is less than in unit cell 112 and the amount of non-fluorinated polymer in unit cell 112 is less than in unit cell 110. The amount of non-fluorinated polymer compound can be determined by integrating the area occupied by layer 106 over total unit cell area $a^2$.

In another embodiment, layer 106 can occupy a majority, such as at least about 50%, such as at least about 70%, or even at least about 90% and not greater than about 99.9%, such as not greater than about 98%, or not greater than about 95% of unit cell area $a^2$ in unit cell 110. In another embodiment, layer 106 can occupy at least about 30%, such as at least about 40%, or even at least about 50% and not greater than about 90%, such as not greater than about 80%, or even not greater than about 70% of unit cell area $a^2$ in unit cell 112. In another embodiment, layer 106 can occupy a minority, such as at least about 1%, such as at least about 2%, or even at least about 5% and not greater than about 50%, such as not greater than about 40%, or even not greater than about 30% of unit cell area a in unit cell 114.

Further addressing layer 106 and the material comprising that layer, the non-fluorinated polymer compound can include a poly-ether-ether-ketone (PEEK), an ultra-high-molecular-weight polyethylene (UHMWPE), a polyimide (PI), a polyamide (PA), a polyamideimde (PAI), a polyphenylsulfide (PPS), a polyhydroxybutyrate (PHB), and any combination thereof. In one particular embodiment, the non-fluorinated polymer compound consists essentially of a poly-ether-ether-ketone (PEEK).

Moving to element 102 in FIG. 1 which comprises the fluorinated polymer compound, the fluorinated polymer compound can include polytetrafluoroethylene (PTFE), a perfluoroalkoxy polymer (PFA), fluorinated ehylene-propylene (FEP), polyvinylfluoride (PVF), polyvinylidene fluoride (PVDF), polychlorotrifluoroethylene (PCTFE), a polyethylenetetrafluoroethylene (ETFE), a polyethylenechlorotrifluoroethylene (ECTFE), and any combination thereof. In one particular embodiment, the fluorinated polymer compound consists essentially of polytetrafluoroethylene (PTFE).

The combined thickness of layers 106 and 102 (including mixed zones 104) can be at least about 2 microns, such as at least about 5 microns, at least about 10 microns, at least about 20 microns, at least about 40 microns, at least about 80 microns, or even at least about 120 microns. In another embodiment, the combined thickness of layers can be not greater than about 1 mm, such as not greater than about 800 microns, not greater than about 500 microns, not greater than about 300 microns, not greater than about 200 microns, or not greater than about 150 microns. Moreover, it will be appreciated that the combined thickness of layers 106 and 102 can be within a range between any of the minimum and maximum percentages noted above.

Addressing the average thickness of layer 106. In instances, the thickness of the non-fluorinated polymer compound layer 106 can be at least about 1 micron, such as at least about 2 microns, at least about 5 microns, at least about 10 microns, at least about 20 microns, at least about 30 microns, at least about 50 microns, at least about 70 microns, or at least about 100 microns. In other instances, the porous non-fluorinated polymer layer 106 can have a thickness of not greater than about 800 microns, such as not greater than about 500 microns, such as not greater than about 300 microns, not greater than about 200 microns, not greater than about 180 microns, not greater than about 150 microns, or not greater than about 120 microns. Moreover, it will be appreciated that the average thickness of layer 106 can be within a range between any of the minimum and maximum thicknesses noted above.

Addressing the average thickness of layer 102, the fluorinated polymer compound layer can have a thickness of at least about 2 microns, such as at least about 5 microns, at least about 10 microns, at least about 20 microns, at least about 30 microns, at least about 50 microns, at least about 70 microns, or at least about 90 microns. In other instances, the fluorinated polymer compound layer 102 can have a thickness of not greater than about 800 microns, such as not greater than about 500 microns, not greater than 300 microns, not greater than about 200 microns, not greater than about 180 microns, not greater than about 150 microns, or not greater than about 120 microns. Moreover, it will be appreciated that the average thickness of layer 102 can be within a range between any of the minimum and maximum thicknesses noted above.

Addressing the weight amounts of the various layer materials, in embodiments, the non-fluorinated polymer compound can include at least about 5 wt %, such as at least about 10 wt %, at least about 20 wt %, or at least about 30 wt % of the combined weight of layers 102 and 106 (including mixed zones 104). In other embodiments, the non-fluorinated polymer compound can include not greater than about 80 wt %, such as not greater than about 60 wt %, or not greater than about 40 wt % of the combined weight of layers 102 and 106 (including mixed zones 104).

In yet other embodiments, the amounts of the layer materials included in layer 102 and 106 can be addressed by volumetric amounts. In embodiments, the non-fluorinated polymer comprises at least about 5 vol %, such as at least about 10 vol %, at least about 20 vol %, at least about 30 vol %, or at least about 40 vol % of the total volume of the layers 102 and 106, which includes mixed zones 104 and any closed porosity (not shown in FIG. 1). In other embodiments, the non-fluorinated polymer comprises not greater than about 90 vol %, such as not greater than about 80 vol %, not greater than about 60 vol %, not greater than about 40 vol %, or not greater than about 30 vol % of the total volume of the non-fluorinated polymer layer and the fluorinated layer.

In instances, the non-fluorinated compound or the fluorinated layer can include at least one filler. The filler can include fibers, glass fibers, carbon fibers, aramids, inorganic materials, ceramic materials, carbon, glass, graphite, aluminum oxide, molybdenum sulfide, bronze, silicon carbide, woven fabric, powder, sphere, thermoplastic material, polyimide (PI), polyamidimide (PAI), polyphenylene sulfide (PPS), polyethersulofone (PES), polyphenylene sulfone (PPSO2), liquid crystal polymers (LCP), polyetherketone (PEK), polyether ether ketones (PEEK), aromatic polyesters (Ekonol), mineral materials, wollastonite, barium sulfate, or any combinations thereof.

The filler can be present in different amounts in each polymer compound. In embodiments, the amount of filler can be at least about 1 vol %, such as at least about 2 vol %, at least about 5 vol %, at least about 10 vol %, at least about 20 vol %, or even at least about 30 vol % of the total volume of the polymer compound. In other embodiments, the filler can be present at not greater than about 90 vol %, such as not greater than about 75 vol %, not greater than about 60 vol %, not greater than about 50 vol %, or not greater than about 40 vol % of the total volume of the polymer compound. Moreover, it will be appreciated that the amount of the at least one filler can be within a range between any of the minimum and maximum volume percentages noted above.

In yet further embodiments, the polymer compounds can include an additive. The additives can include softeners, lubricants, plasticizers, dispersants, UV absorbers, or any other agent necessary to improve the applicability of the laminate article. In embodiments, the additives can include fluoropolymers.

In embodiments, the laminate includes bearing articles. In a particular embodiment, the laminate includes slide bearings. Bearings can be prepared in a vast number of very different shapes and sizes. The smallest bearing, also called a pico bearing, is only a few µm in height compared to bearings for other applications that could be up to 500 mm.

Bearings can include plane bearings, annular bearings, bushings, balljoint bearings (half spheres), plain bearings, axial bearings, thrust bearings, linear bearings, bearing shells, bearing cups and combinations thereof.

In one embodiment, laminates as described herein are maintenance free. The term "maintenance-free" describes laminates that do not need to be greased as was the case for bearings in early car doors. Yet, the life time of maintenance-free bearings exceeds the average life time of the product these bearings are incorporated or the life time of conventional bearings applied for the same purpose.

In one particular embodiment, a bearing article includes a PEEK layer, wherein the PEEK layer is porous. The porosity, which is the ratio of void volume over total volume of the PEEK layer, can be at least about 0.05, such as at least about 0.1, or at least about 0.2. The porosity can be no greater than about 0.8, such as no greater than about 0.7, or not greater than about 0.5.

In one embodiment, the bearing article includes a PTFE composition layer with a thickness of at least about 10 microns, such as at least about 20 microns, at least about 30 microns, at least about 50 microns, or at least about 70 microns. In another embodiment, the bearing article includes a PTFE composition layer with a thickness of not greater than about 500 microns, such as not greater than about 400 microns, not greater than about 300 microns, not greater than about 200 microns, not greater than 180 microns, or not greater than about 150 microns.

In one embodiment, the bearing article includes a PEEK in an amount of at least about 10 vol %, such as at least about 20 vol %, at least about 40 vol %, or at least about 50 vol % of the combined polymer layers, i.e. the combination of the PEEK layer and the PTFE composition layer. In another embodiment, the bearing article includes a PEEK layer in an amount of not greater than about 80 vol %, such as not greater than about 70 vol %, not greater than about 60 vol %, or not greater than about 50 vol % of the combined layers, i.e. the combination of the PEEK layer and the PTFE composition layer.

In yet another embodiment, the bearing article has PTFE composition layer which further includes a filler. The filler can include fibers, glass fibers, carbon fibers, aramids, inorganic materials, ceramic materials, carbon, glass, graphite, aluminum oxide, molybdenum sulfide, bronze, silicon carbide, woven fabric, powder, sphere, thermoplastic material, polyimide (PI), polyamidimide (PAI), polyphenylene sulfide (PPS), polyethersulofone (PES), polyphenylene sulfone (PPSO2), liquid crystal polymers (LCP), polyetherketone (PEK), polyether ether ketones (PEEK), aromatic polyesters (Ekonol), mineral materials, wollastonite, barium sulfate, or any combinations thereof.

In one embodiment, a method of forming a bearing article can include providing a substrate having a major surface. The method can further include roughening the major surface of the substrate. The method can further include applying a layer of a non-fluorinated polymer onto the major surface. The method can also include coating the non-fluorinated polymer layer with a fluoropolymer composition to form a laminate. Furthermore, the method can include pressing the laminate to form the bearing article.

Figure 2:
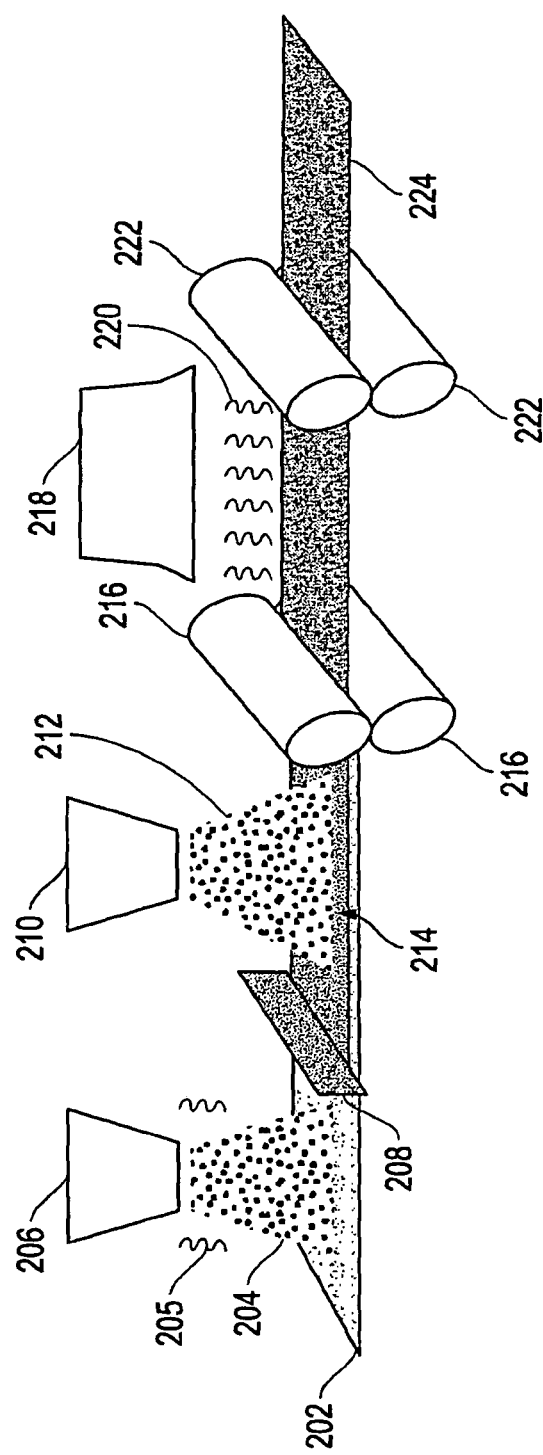
FIG. 2 shows a process for forming a laminate.

FIG. 2 shows an exemplary process for forming a laminate. A metal substrate 202 including a roughened surface is thermally (205) sprayed with a non-fluorinated powder 204. The spraying is conducted through device 206 capable of thermal spraying. Thermal spraying creates a porous layer 214 of the non-fluorinated polymer. The porous layer 214 can be sprayed to any desired thickness. The amount of non-fluorinated polymer applied can be made dependent from properties such as desired adhesion strength to the metal backing or other properties, e.g., electrical insulation, which may require a thicker layer. After the thermal spraying of the non-fluorinated polymer layer, the layer is smoothened by skimming board 208. Next, a fluorinated polymer compound powder 212 from applicator 210 is applied onto the porous layer 214. The fluorinated polymer compound can include any of the fluorinated polymer compounds described herein or a mixture of a fluoropolymer with another polymer, filler, surface agent, softening agent, plasticizer, or any other beneficial agent.

The fluorinated polymer compound layer can be applied to any desired thickness depending from its application purpose. The fluoropolymer compound layer can be sprayed, brushed, paint coated, or applied by any conventional process onto the porous layer 214. For example, as shown in FIG. 2 the fluoropolymer can be sprayed. In embodiments, the non-fluorinated polymer compound and the fluorinated polymer compound can be sprayed subsequently as shown in FIG. 2, concurrent (not shown in FIG. 2) or partially concurrent (not shown in FIG. 2). With respect to the partial concurrent spraying, there is a phase when the non-fluorinated polymer compound is sprayed, a phase when the non-fluorinated polymer compound and the fluorinated polymer compound is applied concurrently, and a phase when the fluorinated polymer compound is applied.

Upon application of the fluoropolymer compound powder, the assembly undergoes pressure and/or heat treatment. As shown in FIG. 2, the assembly can be pressed through rolls 216. In another embodiment, rolls 216 can also be heated, thereby calendering the assembly. Heat 220 can be applied with heater 218. Optionally, after heat treatment, the assembly can be pressed or calendered by rolls 220 to form compound layer 224. In other embodiments and not shown in FIG. 2, the assembly can undergo cold rolling followed by polymer or plastic sintering.

Addressing the non-fluorinated polymer powder, the non-fluorinated polymer can include a poly-ether-ether-ketone (PEEK), an ultra-high-molecular-weight polyethylene (UHMWPE), a polyimide (PI), a polyamide (PA), a polyamideimde (PAI), a polyphenylsulfide (PPS), a polyhydroxybutyrate (PHB), and any combination thereof. In one embodiment, the non-fluorinated polymer consists essentially of poly-ether-ether-ketone (PEEK).

The non-fluorinated powder can have an average particle size of at least about 1 micron, such as at least about 2 microns, at least about 5 microns, or even about 10 microns. In another embodiment, the non-fluorinated powder can have an average particle size of not greater than about 100 microns, such as not greater than about 80 microns, not greater than about 60 microns, or even not greater than about 40 microns.

In another embodiment, the method can include spraying the substrate with a non-fluorinated polymer powder to form the layer 214 to a thickness of not greater than about 800 microns, such as not greater than about 500 microns, not greater than about 400 microns, not greater than about 300 microns, not greater than about 200 microns, not greater than 180 microns, or not greater than about 150 microns. In one embodiment, the method includes spraying the metal substrate with a non-fluorinated polymer powder to form layer 214 to a thickness of at least about 5 microns, such as at least 10 microns, at least about 20 microns, at least about 30 microns, at least about 50 microns, or at least about 70 microns. In embodiments, the method includes applying the non-fluorinated polymer by thermal spraying or by flame spraying the non-fluorinated polymer.

Addressing the fluorinated polymer powder, the fluorinated polymer compound can include a polytetrafluoroethylene (PTFE), a perfluoroalkoxy polymer (PFA), fluorinated ethylene-propylene (FEP), polyvinylfluoride (PVF), polyvinylidene fluoride (PVDF), polychlorotrifluoroethylene (PCTFE), a polyethylenetetrafluoroethylene (ETFE), a polyethylenechlorotrifluoroethylene (ECTFE), or any combination thereof. In one embodiment, the fluorinated polymer compound consists essentially of polytetrafluoroethylene.

The fluorinated polymer powder can have an average particle size of at least about 1 micron, such as at least about 2 microns, at least about 5 microns, or even about 10 microns. In another embodiment, the non-fluorinated powder can have an average particle size of not greater than about 100 microns, such as not greater than about 80 microns, not greater than about 60 microns, or even not greater than about 40 microns.

The fluorinated polymer powder can be applied as dispersion or in dry form. The method includes coating the fluorinated polymer powder by spray coating or paint coating.

In another embodiment, the method can further include heat rolling the laminate layer. In another embodiment, the method can include heat pressing or calendaring the laminate.

In one embodiment, the non-fluorinated layer and the fluorinated layer have a combined thickness of at least about 20 microns, such as at least about 40 microns, at least about 80 microns, or at least about 100 microns. In another embodiment, the combined thickness is not greater than about 1 millimeter, such as not greater than about 500 microns, or at not greater than about 300 microns.

EXAMPLES

High performance non-fluorinated polymers, such as PEEK have favorable properties such as chemical resistance, electric insulation, self-lubrication, or durability against stress. Fluorinated polymers such as PTFE have favorable properties such as chemical resistance, heat resistance, and low friction.

Example 1

An aluminum metal backing was sandblasted at 3 bar to a surface roughness $R_a$ of 3 microns to 4 microns. PEEK with an average particle size of about 20 microns was thermally sprayed onto sandblasted aluminum substrate. Thermal spraying was conducted with an ABB robot 4400. PEEK was flame sprayed using a Castodyn 8000 torch with a M40 nozzle. The spraying distance was between 100 and 300 mm and the nozzle scanning speed was regulated between 150 and 400 mm/s. The scanning steps were regulated between 1 and 5 mm. Between 1 and 5 passes were run over the substrate. After that a PTFE compound was applied with a paint spray gun. The PTFE compound was sprayed from a distance between 100 and 300 mm, with a spray speed between 150 and 400 mm/s, and for 1 to 5 passes. Afterwards, the assembly was sintered at 340° C. for 10 minutes and 430° C. for 5 minutes.

Figure 3:
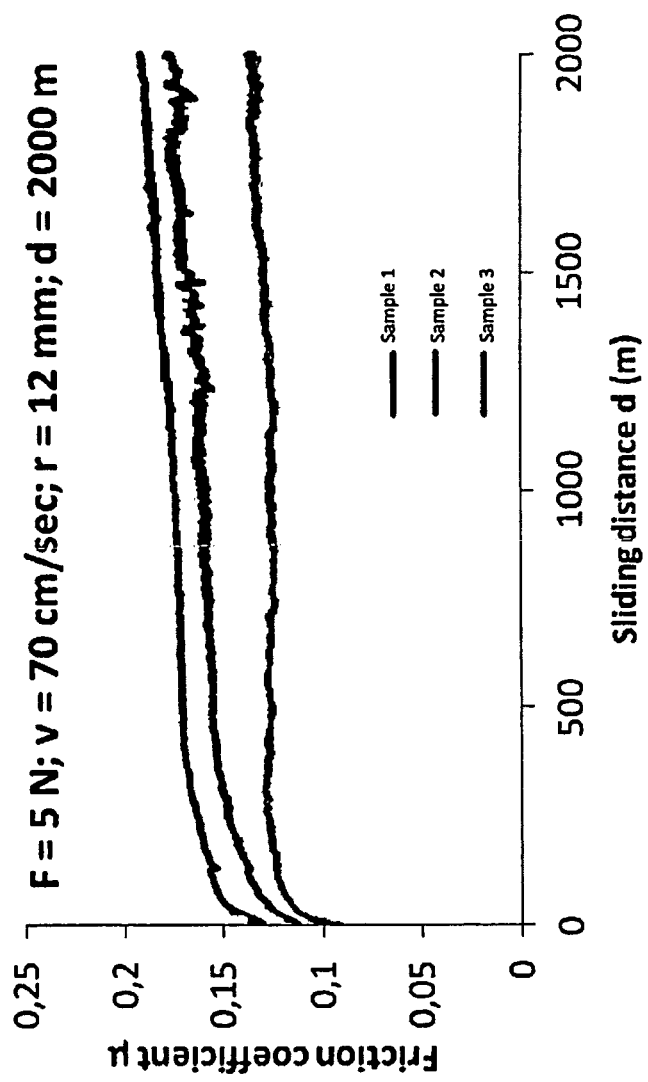
FIG. 3 shows results of tribological tests for laminate samples.

Tribological testing was conducted using a CSM ball-on-disk tribometer using a load of 5N at a speed of 70 cm/s, a ball having a radius of 12 mm. The tests were run over a distance of 2000 m. The results for three samples are summarized in FIG. 3.

Tribological testing results show that COF (Coefficient of Friction) all samples of PEEK/PTFE coatings show substantially constant COF values over the complete duration of the testing. The end values for COF were between 0.125 and 0.175. Although not illustrated in FIG. 3, the end of test COF values for all PEEK/PTFE coatings were lower than the end of test COF values for single PEEK layers (no PTFE coating) or for single PTFE layers (no PEEK layer).

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and FIGS. are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The term "averaged," when referring to a value, is intended to mean an average, a geometric mean, or a median value.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A laminate article, comprising
a substrate layer comprising a metal or a metal alloy; and
a polymer layer comprising:
a stand-alone layer of a non-fluorinated polymer compound having a thickness of at least about 20 microns, the stand-alone layer being disposed directly adjacent to and contacting the substrate without an intervening support layer therebetween, the stand-alone layer comprising a plurality of interconnected voids making up at least 10 vol. % of the total volume of the stand-alone layer, and
a fluorinated polymer compound covering the stand-alone layer and filling at least a portion of the interconnected voids of the stand-alone layer;
wherein the concentration of the fluorinated polymer compound in the polymer layer increases in a direction perpendicular to, and moving away from, the substrate layer such that the polymer layer includes a gradual concentration gradient that includes a change of an amount of the non-fluorinated polymer compound and the fluorinated polymer compound relative to an axis perpendicular to the substrate.

2. The laminate according to claim 1, wherein the non-fluorinated polymer compound is selected from a poly-ether-ether-ketone (PEEK), an ultra-high-molecular-weight polyethylene (UHMWPE), a polyimide (PI), a polyamide (PA), a polyamideimide (PAI), a polyphenylsulfide (PPS), a polyhydroxybutyrate (PHB), and any combination thereof.

3. The laminate according to claim 1, wherein the non-fluorinated polymer compound consists essentially of a poly-ether-ether-ketone.

4. The laminate according to claim 1, wherein the fluorinated polymer compound is selected from polytetrafluoroethylene (PTFE), a perfluoroalkoxy polymer (PFA), fluorinated ehylene-propylene (FEP), polyvinylfluoride (PVF), polyvinylidene fluoride (PVDF), polychlorotrifluoroethylene (PCTFE), a polyethylenetetrafluoroethylene (ETFE), a polyethylenechlorotrifluoroethylene (ECTFE), or any combination thereof.

5. The laminate according to claim 1, wherein the fluorinated polymer compound consists essentially of polytetrafluoroethylene.

6. The laminate according to claim 1, wherein a combined thickness of the stand-alone layer and the fluorinated polymer compound is at least about 30 microns.

7. The laminate according to claim 1, wherein a combined thickness of the stand-alone layer and the fluorinated polymer compound is not greater than about 1 mm.

8. The laminate according to claim 1, wherein the non-fluorinated polymer compound comprises at least about 10 wt % of the combined weight of the stand-alone layer and the fluorinated polymer compound.

9. The laminate according to claim 1, wherein the non-fluorinated polymer compound comprises not greater than about 80 wt % of the combined weight of the stand-alone layer and the fluorinated polymer compound.

10. The laminate according to claim 1, wherein the stand-alone layer, the fluorinated polymer compound, or both, further includes a filler.

11. The laminate according to claim 10, wherein the filler comprises a filler selected from the group consisting of fibers, glass fibers, carbon fibers, aramids, inorganic materials, ceramic materials, carbon, glass, graphite, aluminum oxide, molybdenum sulfide, bronze, silicon carbide, woven fabric, powder, sphere, thermoplastic material, polyimide (PI), polyamidimide (PAI), polyphenylene sulfide (PPS), polyethersulofone (PES), polyphenylene sulfone (PPSO2), liquid crystal polymers (LCP), polyetherketone (PEK), polyether ether ketones (PEEK), aromatic polyesters (Ekonol), mineral materials, wollastonite, barium sulfate, and any combinations thereof.

12. The laminate according to claim 1, wherein the substrate layer has a surface roughness of from 1 micron to 200 microns.

13. The laminate according to claim 1, wherein the non-fluorinated polymer compound further includes a softener or plasticizer.

14. The laminate according to claim 13, wherein the softener or the plasticizer includes a fluoropolymer.

15. The laminate according to claim 1, wherein the voids make up at least about 20 vol. % of the stand-alone layer.

16. The laminate according to claim 1, wherein the laminate consists of the substrate and the polymer layer.

17. A bearing article, comprising
a continuous substrate comprising a metal or a metal alloy;
a polymer layer comprising:
a stand-alone layer of a non-fluorinated polymer compound having a thickness of at least about 20 microns, the stand-alone layer being disposed directly adjacent to and contacting the substrate without an intervening support layer therebetween, the stand-alone layer comprising a plurality of interconnected voids making up at least 10 vol. % of the total volume of the stand-alone layer, and
a fluorinated polymer compound covering the stand-alone layer and filling at least a portion of the interconnected voids of the stand-alone layer;
wherein the concentration of the fluorinated polymer compound in the polymer layer increases in a direction perpendicular to, and moving away from, the substrate layer such that the polymer layer includes a gradual concentration gradient that includes a change of an amount of the non-fluorinated polymer compound and the fluorinated polymer compound relative to an axis perpendicular to the substrate.

18. The bearing article of claim 17, wherein the substrate has a roughened surface.

19. The bearing article of claim 18, wherein the substrate layer has a surface roughness in a range of from about 1 micron to about 200 microns.

* * * * *